Sept. 30, 1958 D. H. WESTWOOD 2,854,662

PULSE-ECHO SYSTEM

Filed Sept. 29, 1954 8 Sheets-Sheet 1

INVENTOR
DAVID H. WESTWOOD
BY J. C. Whittaker
ATTORNEY

PULSE-ECHO SYSTEM

Filed Sept. 29, 1954 8 Sheets-Sheet 2

INVENTOR.
DAVID H WESTWOOD
BY J. L. Whittaker
ATTORNEY

INVENTOR.
DAVID H. WESTWOOD
BY J. L. Whittaker
ATTORNEY

INVENTOR.
DAVID H. WESTWOOD
BY J. L. Whittaker
ATTORNEY

INVENTOR.
DAVID H. WESTWOOD
BY J. L. Whittaker
ATTORNEY

INVENTOR.
DAVID H. WESTWOOD
BY J. L. Whittaker
ATTORNEY

INVENTOR.
DAVID H. WESTWOOD
BY J. C. Whittaker
ATTORNEY

PULSE-ECHO SYSTEM

Filed Sept. 29, 1954

INVENTOR.
DAVID H. WESTWOOD
BY J. L. Whittaker
ATTORNEY

United States Patent Office 2,854,662

Patented Sept. 30, 1958

2,854,662

PULSE-ECHO SYSTEM

David H. Westwood, Haddonfield, N. J., assignor, by mesne assignments, to the United States of America as represented by the Secretary of the Air Force Application September 29, 1954, Serial No. 459,146

29 Claims. (Cl. 343—13)

The present invention relates to a pulse-echo (radar) system and in particular to a so-called "direct reading," distance determining pulse-echo system.

A general object of the present invention is to provide an improved pulse-echo distance measuring system.

Another object of the invention is to provide an improved pulse-echo distance measuring system of the direct reading type, that is, of the type wherein a pointer or similar mechanical arrangement is used to indicate the distance to a reflecting object.

Yet another object of the present invention is to provide an accurate calibration circuit for the distance measuring system of the pulse-echo system.

A further object of the present invention is to provide a calibration system for a pulse-echo distance measuring system which enables the system rapidly to be calibrated at any and all ranges within the range of the system.

Still another object of the present invention is to provide an improved pulse-echo distance measuring system which is light in weight and requires a minimum number of stages and circuit components.

Another object of the present invention is to provide an improved phase shifting circuit which is operative over an extended range.

It is another object of the present invention to provide a phase shifter of the above type which is extremely accurate over its entire range.

It is another object of the present invention to provide a phase shifter of the above type having an inherent absolute accuracy which is substantially the same at maximum range as at minimum range.

A typical embodiment of the present invention includes a phase shifter for accurately determining within predetermined angular limits the phase of a given wave with respect to a reference wave. Such a phase shifter may be, but is not limited to, a sawtooth phase shifter. The invention includes means responsive to the phase angle between the given and reference waves whenever the angle reaches either one of the above limits for shifting the phase of the reference wave by a known amount, not greater than the phase angle encompassed by the pair of limits, in the direction of said one limit. Thus, the comparatively limited phase shifting range between the two waves may be extended practically indefinitely in the direction of increasing or decreasing time referred to an arbitrary point on the reference wave.

A preferred form of the present invention comprises a pulse-echo system having a transmitter for transmitting a pulse to a reflecting object and a receiver for receiving the echo pulse reflected from the object. Means are provided for generating timing signals such as pulses spaced from one another known intervals of time which are fractions of the time required for the transmitted pulse to reach an object at the extreme range of the pulse-echo system. The timing pulse generator may include a crystal controlled oscillator or other accurate time base oscillator and means for deriving pulses of a given polarity from the oscillator such as a sharpening, nonlinear amplifier, squaring stage and differentiator or similar circuit.

The main transmitted pulse is synchronized with one of the timing pulses. The phase shifter, as above described, is employed to generate a linear wave in phase with a timing pulse which has a center region having a duration at least equal to the time interval between timing pulses. The linear wave is so phased that the echo pulse occurs during the time of occurrence of the center region thereof.

The linear wave extends through a reference voltage and means are provided for generating a steep fronted wave coincidentally with the intersection in point of time of the linear wave with the reference voltage. The phase of a portion, preferably the center portion, of the steep fronted wave is compared with that of the echo signal and a control voltage is derived having a sense dependent on the sense of the difference in phase between the two signals. The control voltage is utilized to control a mechanical arrangement which adjusts the direct voltage level of the linear wave so as to bring the steep fronted wave into proper phase with the echo pulse while maintaining the linear wave in its same phase relationship with the timing pulses. The mechanical arrangement actuated by the control voltage is also utilized to actuate a direct reading device such as, in the case of a radio altimeter, a direct reading altitude indicator.

When the steep fronted wave, which follows the phase of the echo signal, is phase shifted to a point such that the intersection along the time axis of the reference voltage and the linear wave occurs at a point outside of the center region of the linear wave, control means are actuated for shifting the phase of the linear wave an interval equal to the interval of time between adjacent timing pulses. The shift is in the proper direction to return the point of intersection of the reference voltage and the linear wave to the center region of the linear wave but the intersection point along the time axis of the linear wave and the reference voltage is maintained the same by simultaneously shifting the direct voltage level of the linear wave. Since the position of the steep fronted wave is dependent solely on the intersection along the time axis of the linear wave and the reference voltage, its position remains substantially the same immediately after as immediately before the shift of the linear wave. Thus, the system provides a continuous altitude indication throughout the range of the pulse-echo system.

In a preferred form of the invention the shifting of the linear wave by intervals equivalent to the spacing between adjacent timing pulses is controlled by a binary divider chain, switches, relays, a gear train and a motor controlled by the control voltage. By increasing the numbers of dividers, switches, and relays, the range of the equipment may be extended indefinitely.

The system also may include a novel calibration circuit for accurately calibrating it at any altitude. This circuit comprises means for blocking the receiver during the reception of an echo pulse and rendering the transmitter operative coincidentally with one of the timing pulses which is closest in point of time to the echo pulse. The transmitter is thereby caused to transmit a calibrating pulse directly into the receiver, at a time which is at a precise, known interval from the normally transmitted pulse. The calibration pulse should therefore cause the altitude indicator to indicate an altitude which is the equivalent of this known interval of time. Any difference in indication is a system error and may be calibrated out of the system by adjusting the level of the reference voltage.

In the preferred form of the invention, the receiver is attenuated during the reception of the calibration pulse to prevent it from saturating.

The invention will be described in greater detail by reference to the following description taken in connection with the accompanying drawings in which.

Throughout the figures similar reference numerals refer to similar elements.

SYSTEM OPERATION

The present invention is particularly applicable to the measurement of altitude, that is, the elapsed time between the transmission of a radar pulse and the reception of a ground echo. It is to be understood, however, that the system is applicable to any type of radar system wherein it is desired to determine the distance to a reflecting object. Also, it is equally applicable to any system wherein it is desired to determine the time delay between a reference pulse and a variable time delayed pulse which is synchronized with the reference pulse and occurs at some time interval following the reference pulse.

In a preferred form of the invention a difference in timing between a received echo pulse and a predetermined portion of a steep fronted wave causes a voltage of proper polarity to be applied to the servomechanism to correct the phase position of the latter with respect to the former. In so doing, the indicator, which may comprise a dial with altitude digits and an indicator pointer, is set to the correct altitude indication.

Figure 1:
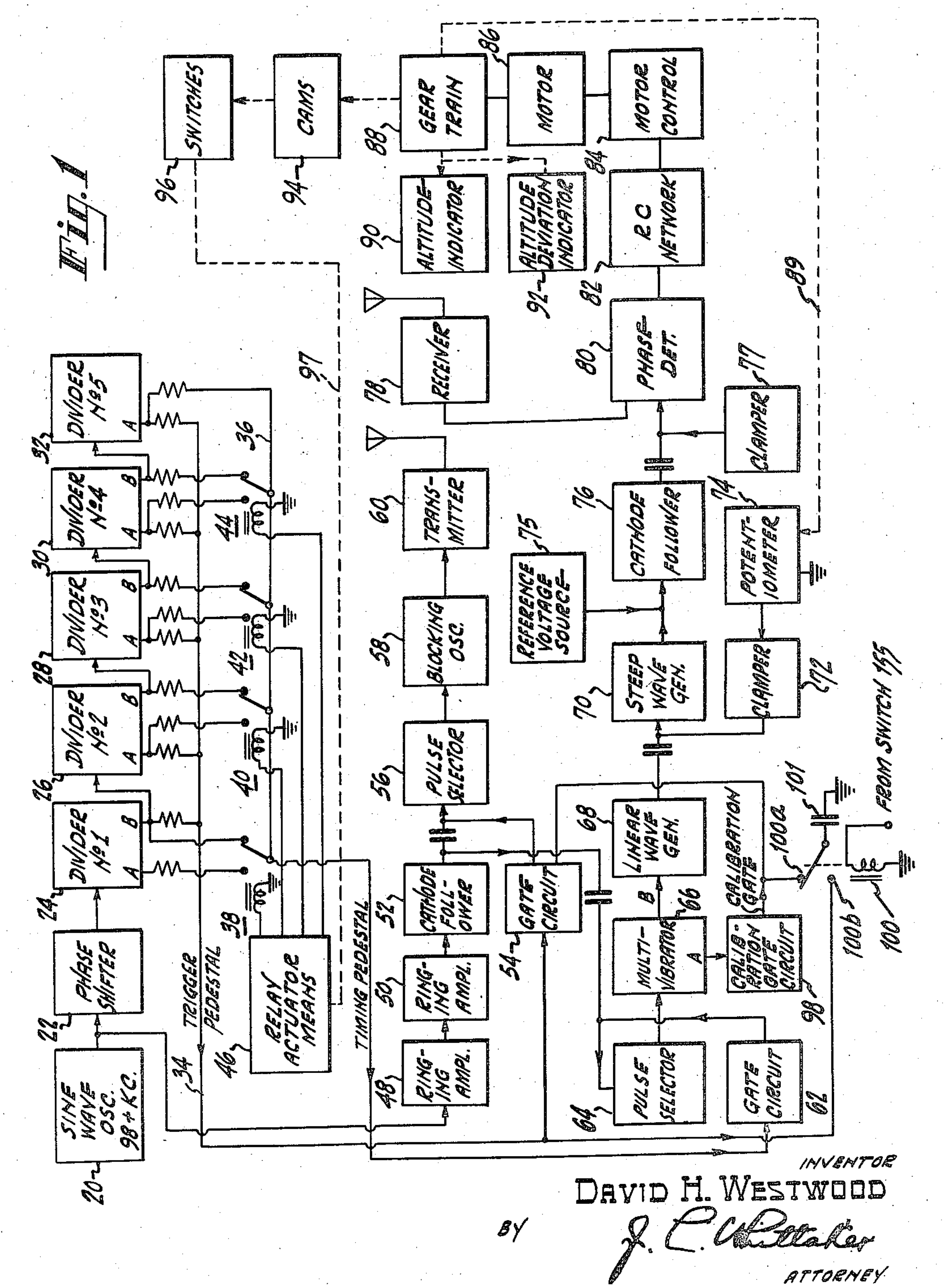
Fig. 1 is a block diagram of a typical embodiment of the invention.

Some of the more important circuits in the system are shown in the block diagram of Fig. 1. Circuits such as those for blanking the receiver and adjusting the gain thereof, conventional receiver indicator circuits, other detailed circuits of the receiver and transmitter and other conventional circuits which play no part in the present invention are not discussed in detail.

Referring now to Fig. 1, timing for the system is established by a stable 98.329 kc. oscillator 20 (hereinafter identified as 98 kc. for purposes of simplicity) the output of which has a period between voltage peaks equal to the radar pulse transit time for 5,000 feet of altitude. The output of the oscillator is applied through phase shifter 22, the purpose of which will be explained later, to a chain of five binary dividers 24, 26, 28, 30 and 32, respectively. The dividers may comprise five cascaded bistable multivibrators each having a pair of output anodes A, B and successive multivibrators providing output waves having twice the period of the preceding multivibrator. The respective outputs at plates A and B of each multivibrator are 180° out of phase as shown in Figs. 8*c*–*l*, inclusive.

Two separate outputs are obtained from the divider chain; the first from lead 34 supplies the trigger channel and the second from lead 36 supplies the timing channel. The two mixed outputs occur at a rate of 3.073 kc. (hereinafter identified as 3 kc. for simplicity).

The output of oscillator 20 is also applied to ringing amplifier 48, ringing amplifier 50 and cathode follower 52. These three stages derive from the sinusoidal wave a plurality of pulses as shown in Fig. 8*b* having a recurrence rate of 98 kc., which it will be remembered is equivalent to 5,000 feet of radar altitude. The stepped waveform output taken from lead 34 and shown in Fig. 8*m* is applied to gate circuit 54 the output of which is applied to pulse selector 56. As will be explained more fully below, when the most positive going portion of the trigger pedestal corresponds with one of the output pulses from cathode follower 52, pulse selector 56 is rendered conductive and applies an output signal to blocking oscillator 58. The latter triggers transmitter 60 causing it to transmit an output pulse.

In the description above, ringing amplifiers are employed to derive pulses from a sinusoidal wave. It should be understood that the invention is not limited to this specific pulse forming means as others such as squaring limiters, blocking oscillators, multivibrators or the like, as will be apparent to those skilled in the art, may be used instead. Moreover, other pulse forming means could be substituted for blocking oscillator 58. Finally, gate producing means other than bistable multivibrators may be employed for the binary divider chain 24—32.

Relays 38, 40, 42, and 44 which are individually actuated by relay actuator means 46 determine which outputs of divider stages 24, 26, 28 and 30 will be connected to lead 36. The relay actuator means 46 therefore determines the phase of the timing pedestal shown in Fig. 8*o*.

Figure 8:
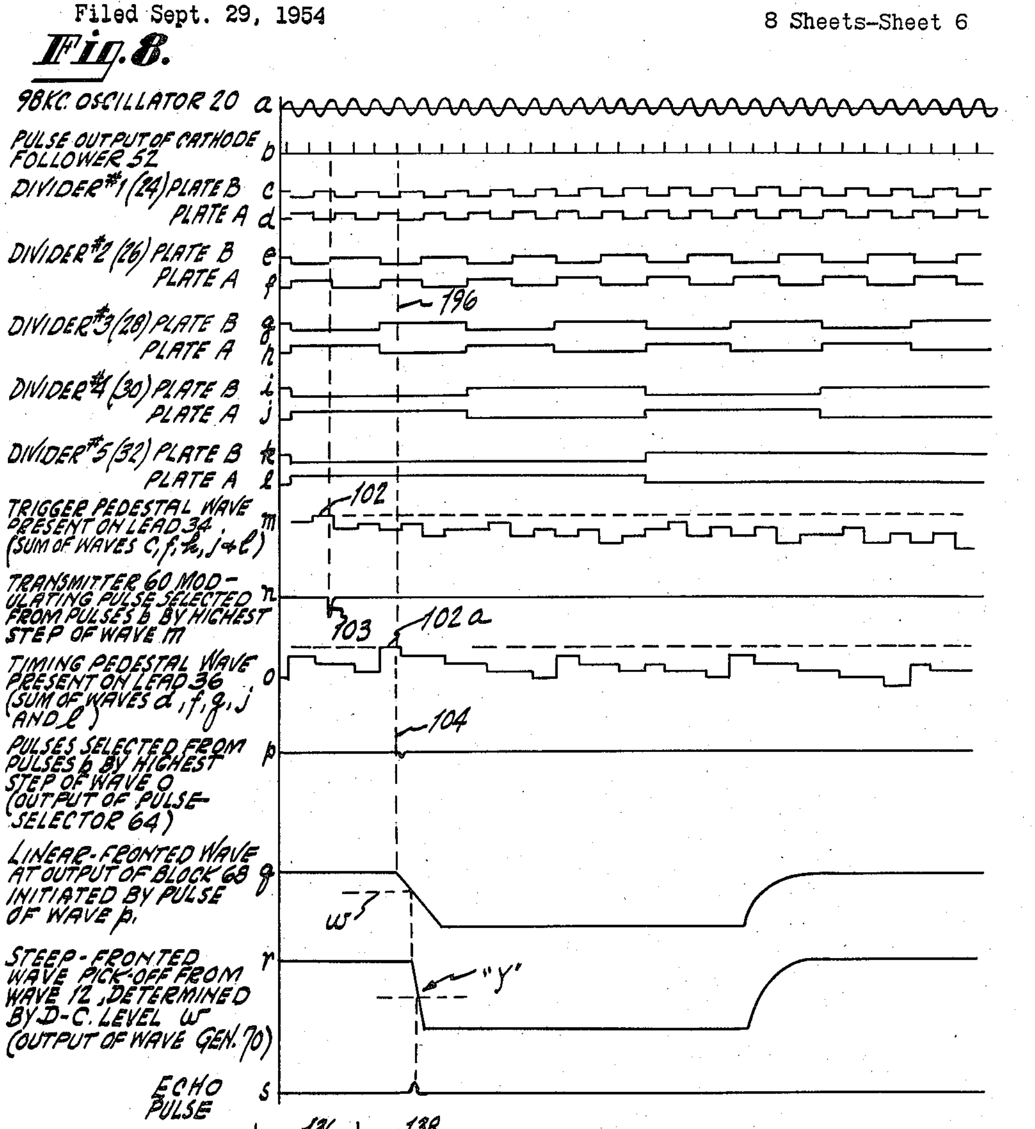
Fig. 8 is a diagram of various waveforms present in the circuit of the present invention.

The timing pedestal is supplied to gate circuit 62 which is substantially identical to gate circuit 54. The pulses from cathode follower 52 are supplied to pulse selector 64 which is substantially identical to pulse selector 56. When the most positive going portion of the timing pedestal is in coincidence with one of the output pulses of cathode follower 52, pulse selector 64 is rendered conductive and supplies a triggering pulse to multivibrator 66. Multivibrator 66 actuates linear wave generator 68 which in turn actuates steep wave generator 70. The phasing of the linear and steep waves is shown in Fig. 8, waveforms *q* and *r*.

Clamper 72, potentiometer 74 and reference voltage source 75 determine the phase position of the steep fronted wave, as will be explained more fully below, and clamper 77 clamps one end of the steep fronted wave to a voltage such that the center portion of the wave is at ground potential. The significance of this circuit will also be explained later.

An echo pulse is received by receiver 78 and applied to phase detector 80. The relative phase positions of the steep fronted wave and the received echo pulse are compared in the phase detector. If the two waves are "in phase," no output signal is applied to the following stages. "In phase" is defined as that condition in which the echo pulse coincides with the ground cross-over point of the steep wave. If the two signals are out of phase, a signal having a polarity dependent upon the sense of the out of phase condition is applied through resistor-condenser network 82, motor control 84 and motor 86 to gear train 88. The gears rotate the arms of potentiometer 74 via mechanical connection 89 and drive the steep fronted wave into phase with the echo pulse.

At the same time gear train 88 actuates altitude indicator 90 and altitude deviation indicator 92 to provide a true reading of altitude and an indication of any deviation in altitude from a predetermined or present altitude, respectively. Gear train 88 also controls relay actuator means 46 through cams 94, switches 96 and mechanical connection 97 in a manner which will be explained in further detail later.

Calibration gate circuit 98 (lower left corner of figure) connected to the output of multivibrator 66 provides a calibration signal for the system which enables the system to be accurately calibrated at any aircraft altitude. This signal is normally shorted to ground through the circuit including relay contact 100*a* and condenser 101. However, when the calibration switch (not shown in Fig. 1) is closed and relay 100 actuated a calibration pedestal gate is applied to gate circuit 54. This circuit will be explained in more detail below.

BINARY DIVIDER CHAIN

Since the bistable multivibrator circuits making up the binary divider chain 24, 26, 28, 30, and 32 are conventional, they are not illustrated in detail. For the trigger channel fixed taps on the divider outputs provide a pedestal waveform occurring at a 3 kc. repetition rate. As can be readily shown from a consideration of waveforms *c–l* of Fig. 8, the most positive going portion 102 of waveform *m* occurs in the phase position indicated. This trigger pedestal gate causes the selection of pulse 103 (Fig. 8) which triggers the transmitter 60. Pulse 103 therefore occurs at a time equal to zero altitude.

For the timing channels, the divider outputs are mixed in a predetermined manner as determined by relay actuator means 46 and relays 38, 40, 42 and 44 to develop a timing pedestal gate pulse at a 3 kc. pulse repetition rate. There are 5 multivibrator stages and therefore $2^5$ or 32 different possible combinations of divider stage outputs. Since, however, there is no choice provided for the fifth divider 32, only 16 combinations are available. As a matter of fact, in a form of the invention actually built, only 13 of the combinations were required since these 13 provided altitude indications up to 60,000 feet. In this form of the invention the use of combinations 14, 15 and 16 was prevented by mechanical stops.

It is to be understood that in embodiments of the invention where distance measurements of greater than 60,000 or 80,000 feet are of interest, these may readily be obtained by using the entire divider chain, adding additional divider chains and relays, or using an oscillator as the time base of the system which has a frequency lower than 98 kc. For example, if a 98 kc. oscillator is employed and there are 10 divider stages each having two possible outputs, there will be obtained $2^{10}$ or 1024 possible combinations of divider stage outputs which is equivalent to ($2^{10} \times 5{,}000$ ft.) or about 1000 miles.

In the form of the invention illustrated, the 16 possible combinations of outputs available are as follows:

*Table I*

| Divider | Combination No. | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 1 | A | B | A | B | A | B | A | B | A | B | A | B | A | B | A | B |
| 2 | A | A | B | B | A | A | B | B | A | A | B | B | A | A | B | B |
| 3 | A | A | A | A | B | B | B | B | A | A | A | A | B | B | B | B |
| 4 | A | A | A | A | A | A | A | A | B | B | B | B | B | B | B | B |
| 5 | A | A | A | A | A | A | A | A | A | A | A | A | A | A | A | A |

It will be apparent that combination 2 is the one provided by the fixed contacts for producing the trigger pedestal pulse. Waveform *o* of Figure 8 (combination 5) represents the output of plates A of the first and second dividers, plate B of the third divider and plates A of the fourth and fifth dividers. The peak of this pedestal is shown at 102*a*. The pulse 104 of waveform *p*, Fig. 8, selected by waveform *o* occurs 15,000 ft. after the transmitted pulse.

The function of phase shifter 22, Fig. 1, is to properly phase the trigger and timing pedestal waveforms with respect to the 98 kc. pulses so that the latter fall near the center of the most positive going portion of the respective pedestals. The phasing of the pedestal waves is not critical but operation is most stable when the 98 kc. pulses occur near the center of the most positive going portion of the pedestal, as already indicated.

Referring now to the table above, combination 2 was selected by permanent connections to form the trigger pedestal. It can be shown that combination 3 will produce a wave having its high step immediately adjacent and following that of combination 2 and that succeeding combinations form pedestal waves with their highest steps following in sequence.

By selectively operating relays 38, 40, 42 and 44 and employing the resultant pedestal wave for gating, it is possible to pass successive ones of the first 16 pulses derived from the 98 kc. oscillator to the timing channel. Each succeeding pulse provides a time delay equal to 5,000 ft. in radar range.

The relays 38, 40, 42 and 44 are so energized that combination 1 forms the timing pedestal when the indicated altitude is between zero and 2500 ft.; combination 2 is used between 2500 ft. and 7500 ft.; combination 3 is used between 7500 ft. and 12500 ft., et cetera. This will be explained in further detail in connection with Fig. 7.

GATE CIRCUIT 54 AND PULSE SELECTOR 56

Figures 2, 3:
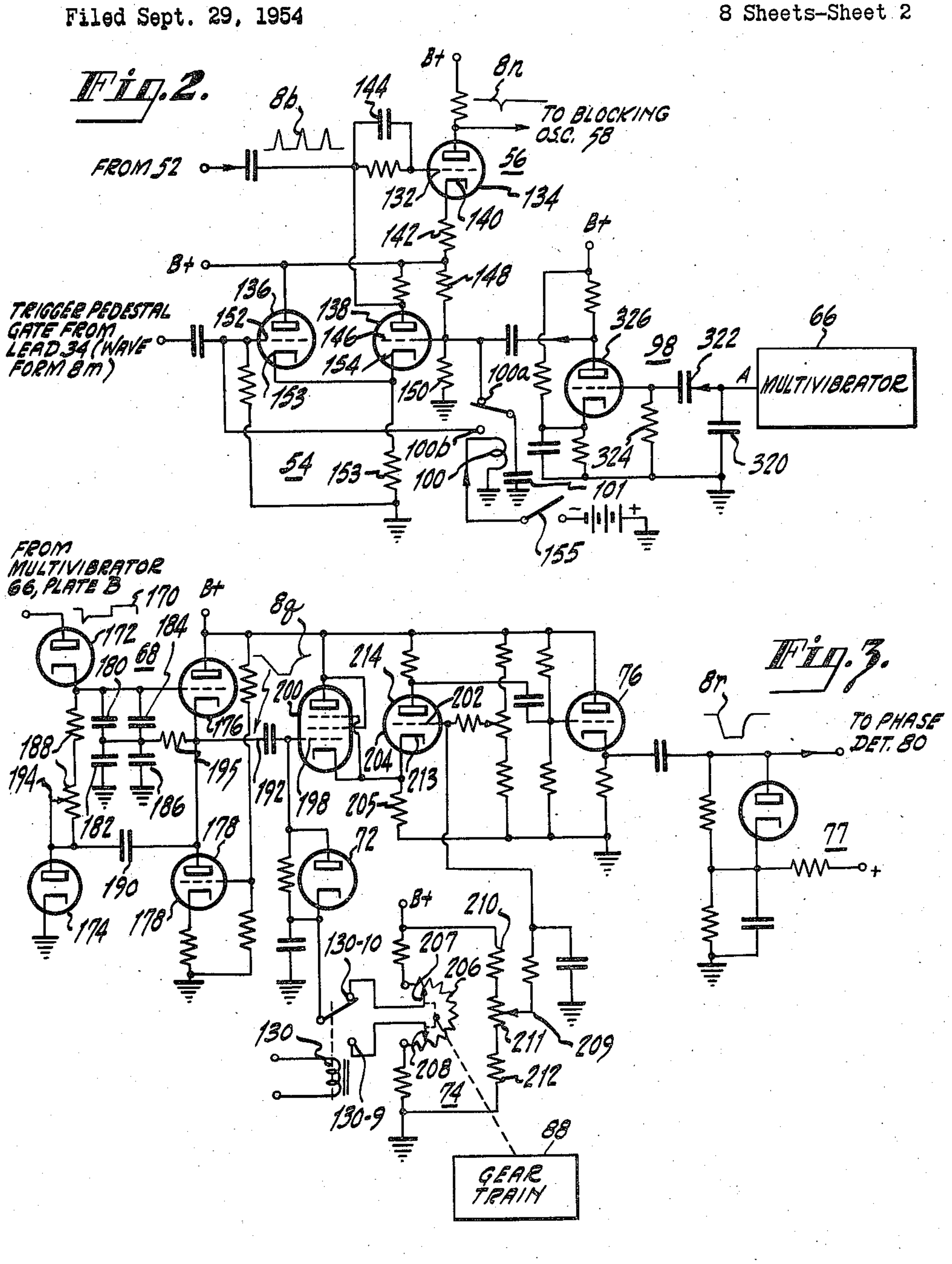
Fig. 2 is a schematic circuit diagram of the gate circuit, pulse selector circuit, and calibration gate circuit shown in Fig. 1.
Fig. 3 is a schematic circuit diagram of the fast (steep wave) and slow (linear wave) sweep circuits and clamper circuits shown in Fig. 1.

Figure 2 includes a circuit diagram of the gate circuit 54 and pulse selector 56. These circuits provide the trigger pulse for the transmitter 60 by selecting every 32nd pulse derived from the 98 kc. oscillator. Sharp, low impedance pulses from cathode follower 52 are applied to the control grid 132 of triode 134. Triode 134 is normally biased to cutoff by the potential applied to its cathode through resistor 142, and the negative bias developed across grid bias capacitor 144.

Gate circuit 54 comprises triodes 136 and 138. The control grid 146 of triode 138 is maintained at a constant positive pontential by a voltage applied thereto from voltage divider 148, 150. Thus, triode 138 normally conducts and its plate voltage which is applied to the control grid 132 is maintained at a low value.

The trigger pedestal gate output of the chain of binary dividers is applied to the control grid 152 of triode 136. Cathode 153 follows the voltage waveform of the trigger pedestal gate and when the maximum positive step of the pedestal wave occurs, the cathode 154 of triode 138 is driven sufficiently positive to decrease the current through triode 138. This causes an increase in the anode voltage of triode 138 which in turn drives control grid 132 sufficiently positive to allow one coinciding 98 kc. pulse to render triode 134 conductive. Since the most positive going portion of the pedestal wave occurs at a 3 kc. rate, there is provided an output pulse 8*n* which 's supplied to blocking oscillator 55 coincident with every 32nd input pulse 8*b*.

The calibration circuit including multivibrator 66, calibration gate circuit 98, relay 100 and calibration switch 155 will be explained in further detail below.

As previously mentioned, pulse selector 64 and gate circuit 62 in the timing channel are substantially identical with the analogous components gate circuit 54 and pulse selector 56 in the trigger channel and therefore the former will not be discussed in detail. Suffice it to say that the pulse selector and gate circuit in the timing channel select every 32nd 98 kc. pulse, the one selected depending upon the positions of relays 38, 40, 42, and 44, which in turn depend upon the altitude of the aircraft.

LINEAR WAVE GENERATOR 68

Referring now to Fig. 3, the square wave output 170 of the B section of multivibrator 66 is applied to diode 172. The entire circuit 68 includes a pair of diodes 172, 174 and a pair of triodes 176, 178. The series connection of triode 178 to the cathode of triode 176 improves the cathode follower action.

In operation, during the positive half of square wave 170, diodes 172 and 174 conduct. The capacitor network 180, 182 and temperature compensating capacitors 184, 186 charge through diode 172 to the full voltage of the multivibrator plate. The voltage appearing across resistor network 188 is equal to the voltage of the multivibrator plate neglecting the small voltage drops across diodes 172 and 174. The output taken from lead 192 during this period is positive as indicated by waveform *8q*.

At the termination of the positive half cycle of the multivibrator input, the input suddenly goes negative and diode 172 is cut off. The capacitor network which is charged to its highest potential begins discharging through resistor network 188 and diode 174. The grid and cathode of triode 176 thereby go negative. The negative cathode voltage change of triode 176 is applied through capacitor 190 to the plate of diode 174 and cuts the latter off. The discharge path of the capacitor network is now through the resistor network and into the negative side of capacitor 190. Since the voltage at both ends of resistor network 188 change at practically the same rate, the current through the resistor is substantially constant and the capacitor network discharges at substantially a linear rate. The output at lead 192 then also falls at a linear rate after diode 172 is cut off. The slope of the linear output wave may be adjusted by varying the position of potentiometer arm 194.

The action described above results in an output wave that is slightly non-linear because the grid-to-cathode voltage of a tube is not constant for different plate currents and plate-to-cathode voltages. To compensate for this effect, the grid voltage of triode 176 is made non-linear in such a way as to make its cathode or output voltage linear. This is accomplished by resistor 195 secured between the cathode of triode 176 and the mid-point of the capacitor network.

The linear portion of the linear wave is approximately equal to two 98 kc. pulse intervals or 10,000 ft. of radar range. The linear wave is moved in 5,000 ft. steps as the indicator changes indicated altitude. Interpolation between pulses is by means of a steep wave to be discussed next.

STEEP WAVE GENERATOR 70

Referring again to Fig. 3, steep wave generator 70 includes pentode 200 and triode 204. These tubes have a common cathode resistor 205 and since the anode of pentode 200 is directly connected to B+ it acts as a cathode follower.

Bias potential is applied to the control grid 198 of pentode 200 from potentiometer circuit 74 through clamper diode 72. The potentiometer circuit includes potentiometer 206 having contact arms 207 and 208 which are 180° apart. Relay 130, the action of which will be described in more detail below, determines which one of the arms is in circuit. The bias voltage applied to control grid 202 of triode 204 is determined by the position of arm 209 along voltage divider 210, 211, 212. In practice, arm 209 is set during the calibration of the instrument and remains in its set position. Arms 207 and 208, on the other hand, change their position as the altitude of the aircraft changes.

In operation, the steep wave generator is essentially a comparison amplifier. When the potential on grid 198 is more positive than the potential on grid 202, pentode 200 conducts and triode 204 is cut off. This is because the flow of current through pentode 200 and common cathode resistor 205 makes the cathode 213 positive with respect to control grid 202. Under this condition the output voltage at the anode 214 is maximum and equal to the B+ voltage. Arm 209 which furnishes the bias to grid 202, hereinafter referred to as the reference voltage, determines the voltage to which the cathode 213 must be lowered in order to render triode 204 conductive.

During the negative going portion of the linear wave, cathode follower action of pentode 200 causes the voltage across cathode resistor 205 also to go more negative and finally a point is reached on the negative slope of wave 82 at which the cathode-to-grid voltage of tube 204 is such as to render the tube conductive. As a result, the anode voltage of the tube rapidly drops producing the steep wave front *8r*.

Summarizing, when voltage on grid 198 is more positive than the reference voltage, the plate voltage of 204 is high; and when the voltage on grid 198 is more negative than the reference voltage the plate voltage of 204 is low, the transition between high and low points providing the steep fronted wave. It is seen then that the position of the steep wave along the time base is dependent on the reference voltage (the position of arm 209) and on the D. C. level of the linear wave (the position of arm 207 or 208, whichever one is in circuit). As will be explained more fully below, arms 207, 208 are in circuit successively for successive 5,000 foot ranges. The transition is at the instant one of relays 38, 40, 42 or 44 cause a new timing pedestal to be selected, and occurs at 2500 ft. and odd multiples thereof.

The steep wave is passed through cathode follower 76 the output of which is clamped by clamper 77 to a potential such that the center of the steep wave is always at ground potential.

Figure 9:
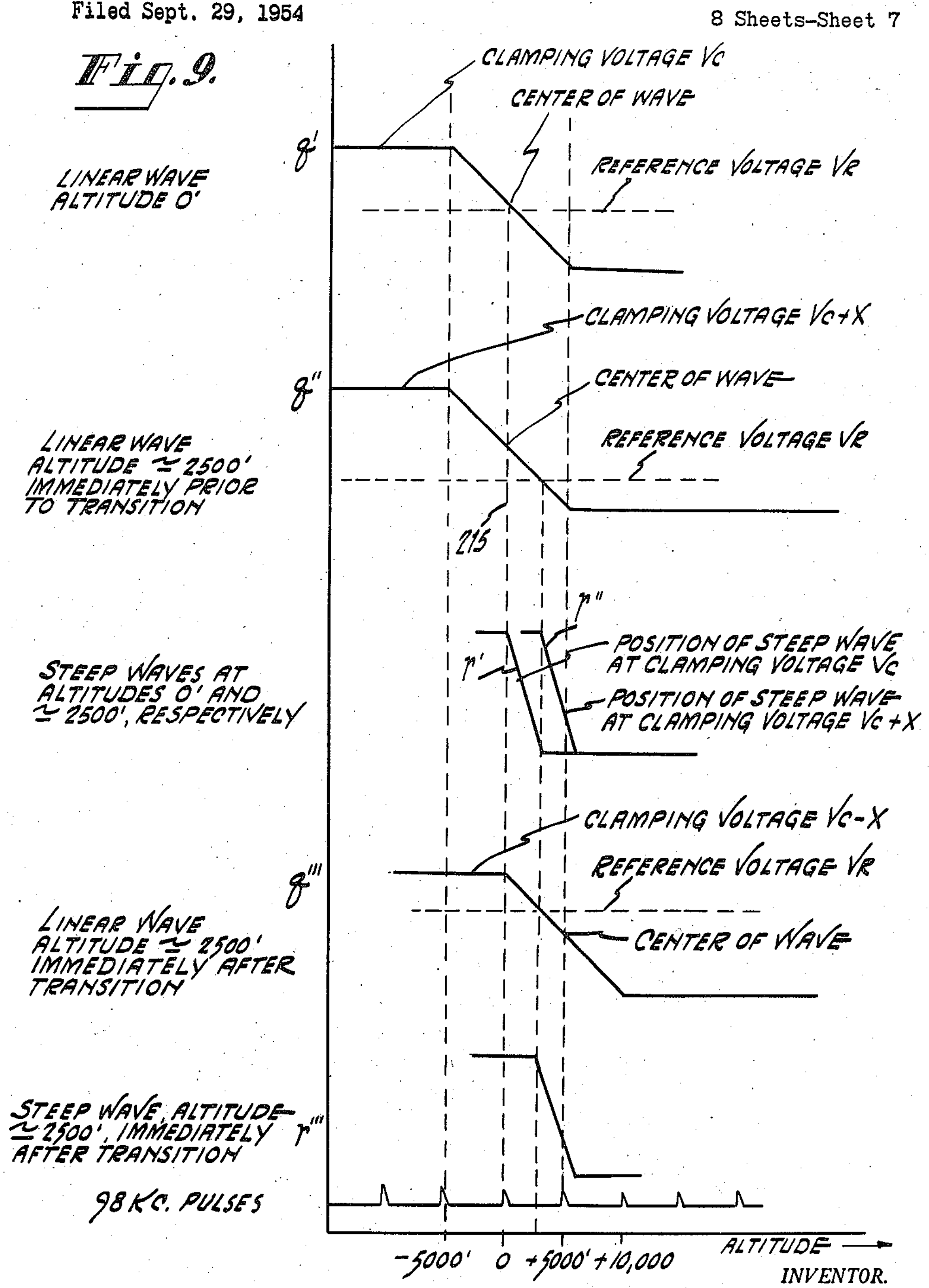
Fig. 9 is a diagram illustrating the phasing under certain conditions of the steep fronted and linear fronted waves.

The manner of operation of the linear and steep wave generators and related circuits will more clearly be understood by reference to Fig. 9. Assume that the aircraft is at zero altitude. In such case, assume that the clamping voltage is $V_c$ and that the reference voltage is $V_r$. As already mentioned, the linear waveform encompasses a range of approximately 10,000 ft., extending in the present case from —5,000 ft. to +5,000 ft. Steep wave $r'$ is initiated at the instant the linear wave becomes more negative than the reference voltage $V_r$ as indicated by dashed line 215. As the aircraft increases its altitude the phase between a ground echo and the steep fronted wave changes, and, as will be explained in more detail later, a voltage is developed by the phase detector 80 (Fig. 1) and fed through network 82 and motor control 84 to motor 86. Motor 86 in turn causes gear train 88 to move potentiometer arm 207 (shown in Fig. 3 as being in circuit) in the correct direction to increase the clamping voltage applied to control grid 198. During this interval the reference voltage $V_r$ which, it will be remembered, has been preset during calibration of the equipment, remains constant. Moreover, during this interval the phase position of the linear wave with respect to the 98 kc. pulses remains the same. The result is that as the aircraft altitude changes the point of intersection along the time axis of the reference voltage $V_r$ and the linear wave also changes.

After the aircraft has reached an altitude of about 2500 ft. the clamping voltage has reached a new value $V_c+x$ and the steep wave has moved along the time or altitude axis from its original position $r'$ to a new position $r''$ with respect to the still stationary position (with respect to time) of the linear wave $q''$. In other words, if the altitude of the aircraft increases up to a certain altitude, the phase position of the linear wave remains the same and the phase angle between the linear wave of the steep wave increases.

When the aircraft reaches an altitude of about 2500 ft. relay 130 (Figs. 3, 6 and 7) is actuated. Two actions result: Potentiometer arm 207 is removed from the clamping circuit and potentiometer arm 208 is placed in the circuit (Figs. 3 and 6), and relay 38 (Fig. 6) is actuated causing plate B of divider 1 to be placed in the timing pedestal circuit. The first action causes the clamping voltage level to assume a new level $V_c—x$ and the second action causes a 5,000 ft. shift in the point at which the linear wave is initiated, as shown in waveform *q''*, Fig. 9. As can be seen from waveform *q'''*, the combined effect of changing the clamping voltage level back to level $V_c—x$ and shifting the linear wave an amount equivalent to 5,000 ft. is that the point of intersection of the reference voltage $V_r$ and the linear wave remains precisely the same. Thus, the phase position of the steep wave immediately after transition relay 130 is operated is precisely the same as immediately before it is operated as shown by wave *r'''*, Fig. 9.

Figure 7:
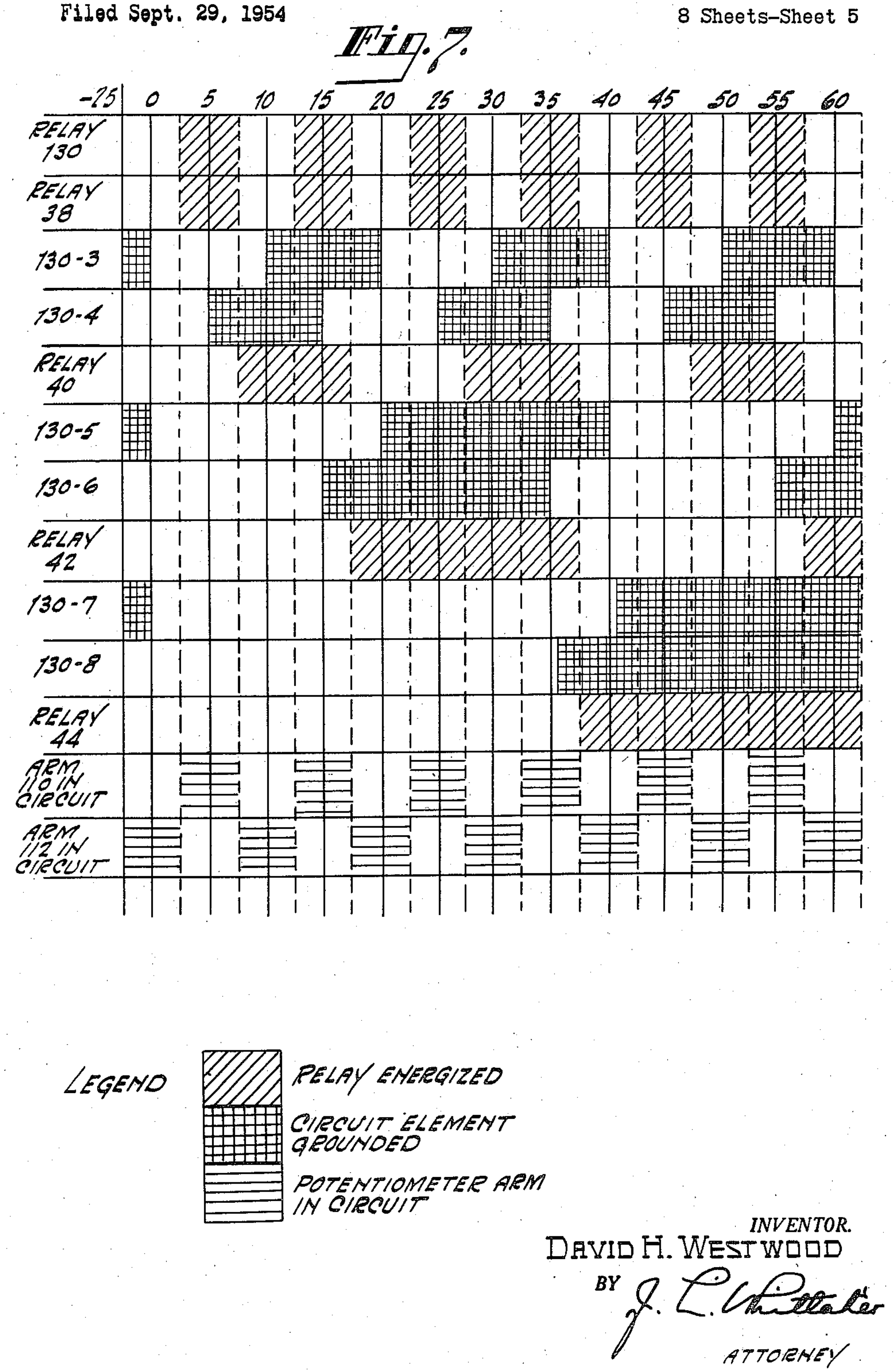
Fig. 7 is a chart showing the phasing of various relays and certain circuit elements contacted thereby shown in Figs. 1, 2, 3 and 6.

The above action enables the steep wave to be smoothly moved from a position corresponding to zero aircraft altitude through the entire range represented by the combinations in Table I above. In each case, it is possible to move the steep wave through an increment equal to about 5,000 ft. after the time the linear wave is transposed to a new position. It is then possible again smoothly to move the steep wave through 5,000 more feet after which the linear wave is again transposed 5,000 ft., etc. The transpositions occur at +2,500 ft., +7,500 ft., etc. as shown in Fig. 7.

It will be observed that the precise time at which each relay 38, 40, 42 and 44 is operated need not be extremely accurate. Also, it should be noted that it is not possible for the dividers and switching circuits to "lose count" since the trigger pedestal wave *m* (Fig. 8) bears a relationship to the timing pedestal wave *o* (Fig. 8) depending upon the status of the four divider relays. If the circuit is turned on when the delayed pulse is occurring somewhat removed from the balance point of a steep fronted wave, an error voltage remains until the servo proceeds through all switching sequences necessary to bring the linear and steep waves into proper phase with the received echo pulse.

PHASE DETECTOR 80

Figure 4:
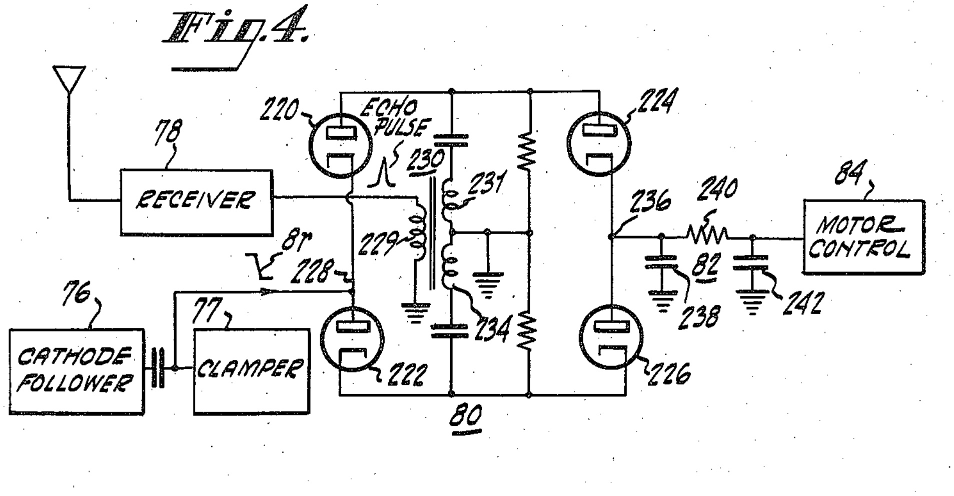
Fig. 4 is a block and schematic circuit diagram of the phase detector shown in Fig. 1.

The phase detector employed in the present circuit is substantially identical with the one illustrated in Fig. 4 of application Serial No. 177,486, jointly filed August 3, 1950, by Robert Trachtenberg and the present applicant and now issued as Patent No. 2,713,160, dated July 12, 1955. The circuit functions to compare the timing of the steep wave and a received echo pulse. When the echo pulse is in phase with the steep wave, that is, when it occurs coincidentally with the center portion of the steep wave as illustrated in Fig. 8, waveforms *r* and *s*, there is no output from the phase detector. Any difference in timing, however, between the steep wave center and the echo pulse, which signifies a difference between the absolute altitude of the aircraft and the altitude indicated on the altitude indicator 90 (Fig. 1), will result in the development of a voltage of the proper sense to cause motor 86 to drive the altitude indicator and simultaneously correct the phasing of the steep wave and echo pulse.

The circuit is shown in Fig. 4 and includes four diodes 220, 222, 224 and 226. The steep wave **8*r* which is clamped at one end by clamper 77 to a voltage such that its center is at ground potential is applied to point 228 so that this point goes both positive and negative with respect to ground. The echo pulse is applied to the primary winding 229 of transformer 230 and is stepped up in amplitude. The center tap of secondary winding 231 is grounded and the secondary polarities are such that positive pulses are applied to the anodes of diodes 220 and 224 and negative pulses are applied to the cathodes of diodes 222 and 226. Diode conduction during the pulses charges capacitors 232 and 234 to almost the peak pulse amplitudes. This charge establishes a bias on the diodes which holds them far below cutoff for the entire time between pulses. During the top portion of the echo pulse, however, the diodes are driven into conduction and points 228 and 236 are effectively connected together through the conducting diodes. Point 236 then assumes whatever voltage the steep wave may have at the instant the echo pulse arrives. It is clear then that if the echo pulse is properly centered on the steep wave front there is no voltage to ground developed across capacitor 238. If the echo pulse is not properly centered on the steep waveform there is a voltage developed with respect to ground having a sense dependent on the phasing of the echo pulse and steep waveform. Any voltage developed at point 236 is smoothed out and retained between pulses by the R-C network comprising capacitor 238, resistor 240 and capacitor 242**.

The result of the operation described above is that any difference between indicated altitude and absolute altitude also provides a difference in phasing between a received echo pulse and the steep fronted wave. This difference causes a voltage output of the phase detector which when amplified in the motor control circuit drives the indicator in the correct direction to reduce the altitude error to zero.

MOTOR CONTROL CIRCUIT 84

It will be apparent that numerous types of motor control circuits known in the art may be employed between the phase detector 80 and reversible motor 86. For example, the motor control circuit shown in Fig. 5 of application Serial No. 177,486, mentioned above, may be employed.

Figure 5:
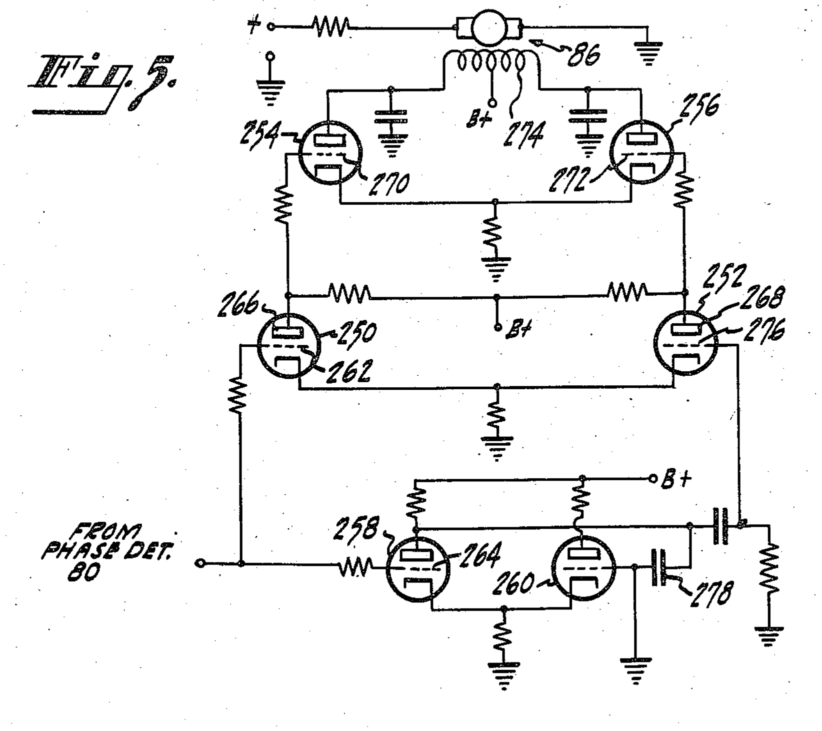
Fig. 5 is a schematic circuit diagram of the motor control system shown in Fig. 1.

A preferred embodiment of the invention includes the phase detector of Fig. 5. This circuit is essentially a direct current amplifier and consists of three sets of triodes 250, 252; 254, 256; and 258, 260. The phase detector output is fed to grid 262 of direct current differential amplifier 250, 252 and to grid 264 of cathode coupled rate amplifier 258, 260. The presence of a direct current signal on grid 262 gives rise to an unbalanced or push-pull output at plates 266, 268. This output is D. C. coupled to grids 270 and 272, respectively, and causes an unbalanced current in the two tridoes 254, 256. The plate currents of triodes 254, 256 are applied to different halves of field winding 274 of motor 86. As can readily be seen, when there is more current flowing through one half of the field winding than the other, the motor will run in a direction determined by the stronger of the two fields. The direction of rotation of the motor is in the proper sense to reduce the altitude error to zero and simultaneously to correct the phase position of the steep wave and received echo signal.

The output of the rate amplifier 258, 260 is capacitively coupled to grid 276 of triode 252. Triode 252 amplifies the alternating current rate components of the error voltage to provide damping for the servo loop. Capacitor 278 by-passes a substantial portion of any noise signal which may be present but the rate information is not changed to any substantial degree below its input level.

TIMING PEDESTAL CIRCUITS

Figure 6:
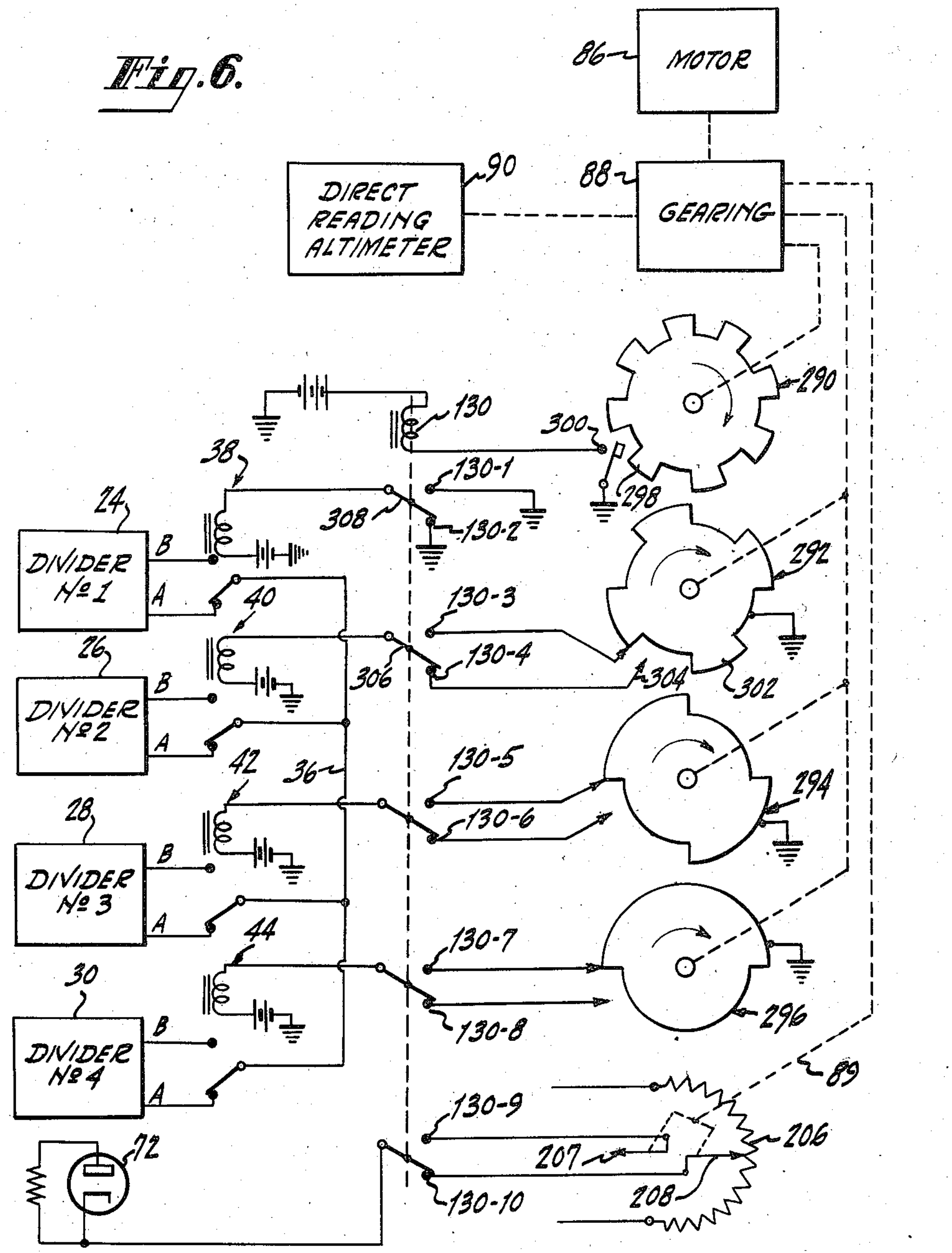
Fig. 6 is a schematic circuit diagram of the timing pedestal circuits of Fig. 1.

As previously explained, the timing channel requires successive 98 kc. pulses (5,000 ft. spacing) as the aircraft travels through successive 5,000 ft. ranges. These pulses are selected by the timing pedestal formed by the chain of binary dividers, the selection being controlled by relays 38, 40, 42 and 44. Thus, different 5,000 ft. altitude ranges cause different pulses (104, Fig. 8) to be selected to initiate different linear sweeps extending through the particular setting of the altitude indicator. The circuits for accomplishing the above are shown in Fig. 6 and the phasing of the various elements of the circuit in Fig. 6 is shown in Fig. 7. The circuit includes four cams 290, 292, 294 and 296. In one form of the invention the cams may rotate at the same speed, cam 290 being provided with 22¼° cut-out sections, cam 292 with 45° cut-out sections, cam 294 with 90° cut-out sections and cam 296 with a 180° cut-out section. The gearing 88 is so adjusted in this form of invention that cams 290, 292, 294 and 296 make one revolution in 80,000 ft. The arms 207, 208 of linear potentiometer 206 make one complete revolution each 10,000 ft. of altitude.

In a second form of the invention the gearing 88 may be so adjusted that cam 290 has less than 8 teeth provided it operated at a higher speed than the other cams. In a model of the invention actually constructed cam 290 did in fact comprise a single rather than a multiple cam and operated at a higher speed than the remaining cams.

The switching action can be best understood by referring to Figs. 6 and 7 at the same time. Assume that the circuit is initially at zero altitude and that the aircraft is climbing. From the previous discussion and by referring to Table I it is seen that at zero altitude the relays 38, 40, 42 and 44 should select the A plates of each divider. Figure 6 shows this condition, each of the relays being unenergized. As the aircraft increases its altitude, the phase position of the echo pulse with respect to the steep waveform tends to change resulting in an output direct current signal of the proper sense to start motor 86 operating. The motor rotates the cams through the gearing 88. At an altitude of about 2500 ft. tooth 298 of cam 290 bears against the arm of switch 300 and closes the switch. This completes the circuit of relay 130 and relay contacts 130–1 to 130–10 are all thrown from their even numbered to their odd numbered positions. This completes the circuit of relay 38 which places plate B of divider 1 in circuit. Referring again to Table I, it is seen that the combination BAAAA is combination 2. Relays 40, 42 and 44 are not energized because their ground returns are open at cams 292, 294 and 296, respectively. However, actuation of relay 130 does cause the selection of the second arm of linear potentiometer 206 which changes the linear wave clamping level in the manner previously described.

When the aircraft attains an altitude of about 5,000 ft. the cams have moved about 45° and cam tooth 302 of cam 292 engages brush 304. This, however, does not complete the circuit of relay 40 since arm 306 is engaged with contact 130–3.

As the aircraft continues to gain altitude and reaches about 7500 ft., cam tooth 298 becomes disengaged from the arm of contact 300 and relay 130 opens. The release of relay 130 causes the return of contact arm 308 to contact position 130–2 releasing relay 38 and returning divider 1 to the A multivibrator plate. At the same time, the release of relay 130 causes arm 306 to move to contact 130–4 which, it will be remembered, is now grounded through tooth 302 of cam 292. Thus, relay 40 is energized and plate B of divider 2 is selected. Relays 42 and 44 remain unenergized. Referring again to Table I, combination ABAAA is the third combination. The release of relay 130 also causes transposition to the arm of linear potentiometer 206.

If the above operation is carried out for the entire range of the radio altimeter it will be seen that the combinations of Table I are successively set up. Each combination will be set up at the precise time that relay 130 transposes at odd multiples of 2500 ft.

CALIBRATION CIRCUIT

The calibration circuit permits fixed error to be calibrated out of the equipment while the aircraft is at any altitude, the calibration point being zero or the 5,000 ft., setting which is nearest to the aircraft altitude. The circuits involved are shown in Figures 2 and 10 and pertinent waveforms in Fig. 11.

Figure 10:
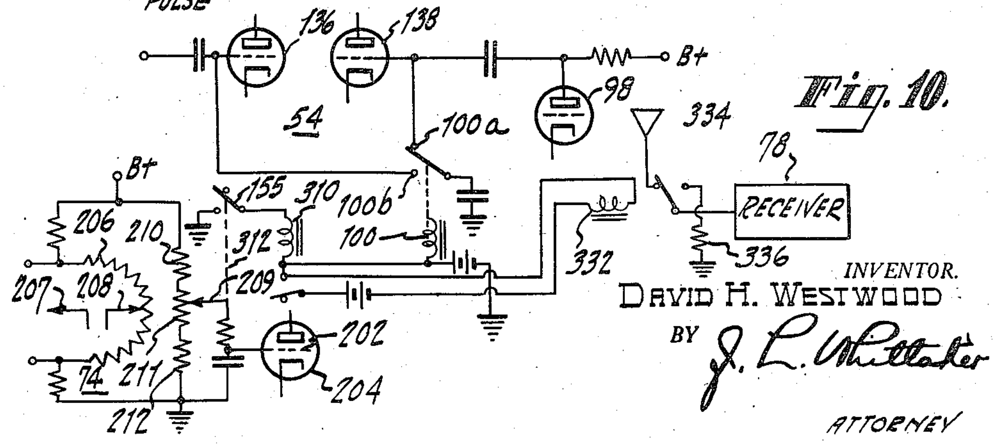
Fig. 10 is a schematic circuit diagram of the calibration system of the present invention.

Referring now to Figs. 2 and 10, calibration switch 155 is of the type which may be rotated when closed. It is mechanically connected through connection 312 to arm 209 of voltage divider 210, 211, 212 (see also Fig. 3) and, when rotated, adjusts the position of arm 209. Arm 209 controls the reference voltage applied to control grid 202 of triode 204.

When the calibration switch is closed, relays 100 and 310 are actuated. Their function is described below.

Figure 11:
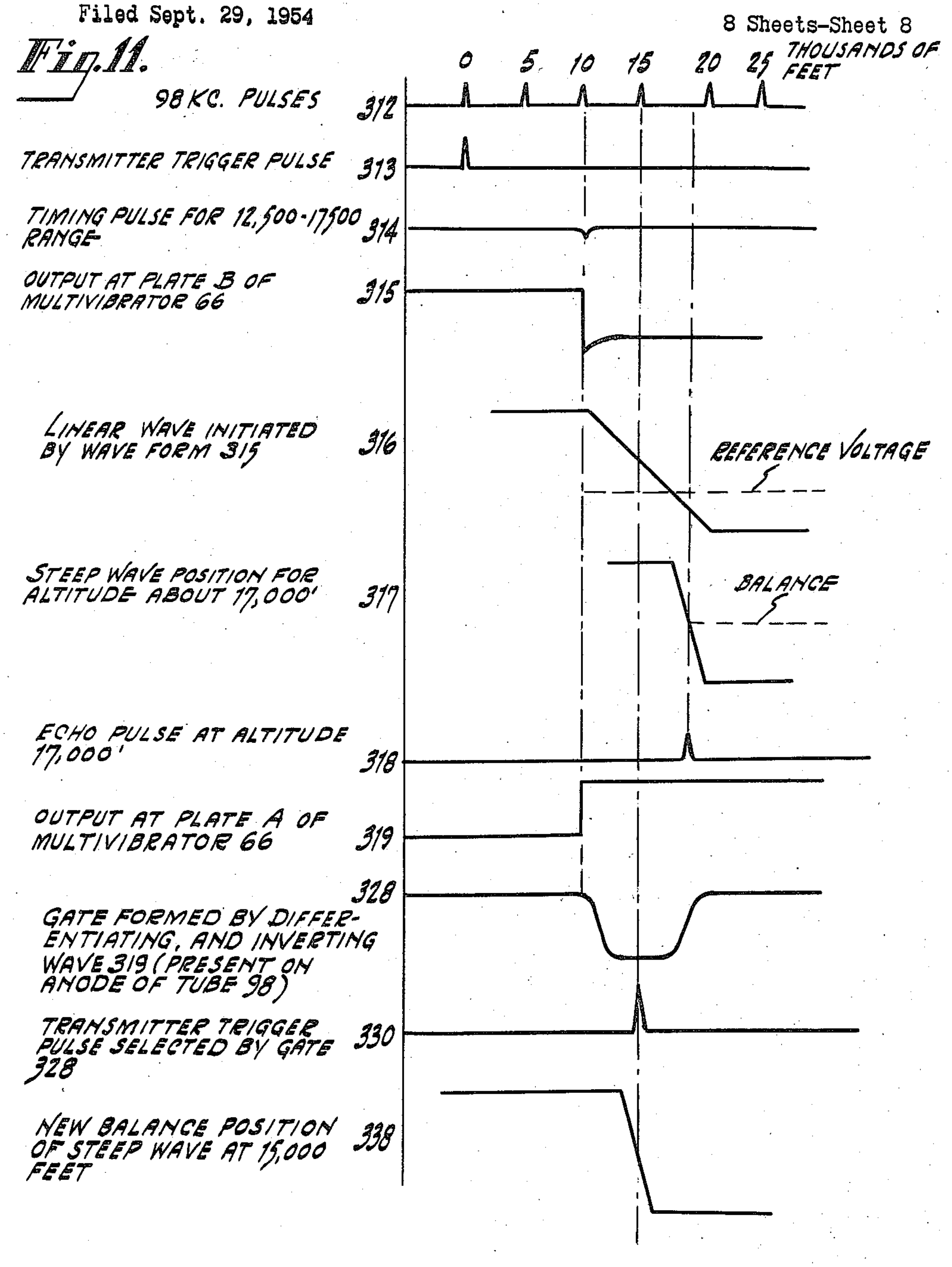
Fig. 11 is a diagram of various waveforms present at different points in the calibration circuit.

For purposes of explanation, assume that the conditions of the equipment are as shown in Fig. 11, waveforms 312—319, respectively. The aircraft is at an altitude of approximately 17,000 ft. The transmitter pulse occurs at zero altitude as shown in waveform 313. The timing pulse for the 12,500 to 17,500 ft. range occurs at a time equivalent to 10,000 ft. of altitude as shown in waveform 314. Output wave 315 at plate B of multivibrator 66 initiates linear waveform 316. The steep wave position occurs at a point in time corresponding to the intersection of the reference voltage and the linear waveform as shown by curve 317. The echo pulse 318 occurs at an altitude of approximately 17,000 ft.

When relay 100 is energized the short-circuit is removed from contact 100a and applied to contact 100b (Figs. 2 and 10). This shorts the trigger pedestal gate which is normally applied to the control grid of triode 136 in gate circuit 54.

Referring to Figs. 2, 10 and 11, the positive output 319 at plate A of multivibrator 66 is differentiated by differentiating network including capacitors 320 and 322 and resistor 324. The peak portion of the differentiated wave is amplified by triode 326 of the calibration gate circuit 98 and waveform 328 shown in Fig. 11 obtained. This waveform is now applied to control grid 146 of triode 138 in gate circuit 54 and thence to the control grid 132 of pulse selector 56 causing the selection of the 98 kc. pulse 320 coincident with the center of the linear wave. In the present case, the 15,000 ft. pulse is selected and this pulse serves as the triggering pulse 330, Fig. 11, for the transmitter. The transmitter now transmits a calibration pulse at a time equivalent to an altitude of 15,000 ft. rather than at time zero.

The transmitted calibration pulse normally would cause saturation of the receiver; however relay 332, which it will be remembered is now actuated due to the energization of relay 310, prevents this from occurring. Relay 332 disconnects the receiver from the normal receiving antenna 334 and connects it instead to resistor 336 which now serves as an attenuating means. The transmitted signal therefore is picked up at reduced amplitude by the receiver.

In a preferred form of the invention relay 332 may also be connected to be energized whenever the aircraft is lower than a predetermined altitude such as, for example, 300 to 600 ft. to prevent receiver saturation by a strong echo pulse.

The overall result of circuit operation when calibration switch 155 is closed is that the echo pulse is removed and a transmitted calibration pulse occurring at a time equivalent to 15,000 ft. altitude is fed into the receiver (see curve 330, Fig. 11). This calibration pulse is not in proper phase position with respect to steep wave 317 and a D. C. voltage is therefore produced by phase detector 80 of the proper sense again properly to phase the steep wave with the received signal. The motor control circuits will therefore drive the altitude indicator until it indicates about 15,000 ft. at which time the steep wave will be in the position shown by waveform 338, Fig. 11.

If the indicator does not register precisely 15,000 ft. there is a fixed amount of error in the system. Rotating the calibration control 155 which in turn moves arm 209 until the indication is exactly 15,000 ft. will remove this error. As already explained, rotation of the calibration control 155 changes the reference voltage which in turn affects the position of the steep wave relative to the linear wave.

Calibration never involves more than a 2500 ft. change in altimeter indication as it operates to the nearest 5000 ft. point any time the equipment is calibrated. An important advantage of this type of calibration is that the calibration error is precisely the same at maximum altitude as at minimum altitude.

An important advantage of the entire system is its extremely high accuracy over its entire range. Accuracy is limited by two factors only, each of which is subject to very close control. One is the degree of "matching" of the linearity of a potentiometer, which may be controlled very precisely, to the linearity of the linear wave, and the other is the accuracy of an oscillator which also may be controlled precisely. In an embodiment of the invention actually built, the maximum error of the system in fact was found to be fifteen feet. This is a maximum peak error and is not exceeded through the entire range of the altimeter.

What is claimed is:

1. In a phase shifter, in combination, means producing a first wave having a linear region extending between a first limit and a second limit; means for accurately shifting the phase of said first wave by fixed, known amounts, each not greater than that defined by said region; means for producing a second linear wave having a slope which is substantially greater than that of the linear region of said first wave; means for accurately shifting the phase of said second wave within said region; and means responsive to a shift in phase of said second linear wave with respect to said first linear wave beyond said region in either direction for shifting the phase of said first wave in said direction said known amount.

2. In a phase shifter, in combination, means producing a plurality of pulses spaced in time from one another fixed amounts; means producing a first linear wave extending from one of said pulses beyond an immediately adjacent pulse to at least a third pulse, said wave being linear throughout its entire extent, and having a region extending from a point located approximately midway between said one pulse and said immediately adjacent pulse to a second point approximately mid-way between said immediately adjacent pulse and said third pulse; means for producing a second wave; means for accurately shifting the phase of said second wave with respect to said first wave over said region; and means responsive to a shift in phase of said second wave with respect to said first wave beyond said region in either direction for shifting the phase of said first wave in said direction by an angle equivalent to the spacing between adjacent ones of said pulses.

3. A circuit for shifting the phase of a given signal through a predetermined phase angle with respect to a reference signal comprising means for generating timing signals separated in phase from one another given angles which are fractions of said predetermined phase angle, one of said timing signals being in a predetermined phase relationship with said reference signal; means for generating a comparison wave which extends at any instant in a given direction at least from one of said timing signals beyond another of said timing signals adjacent thereto, said wave including a first portion adjacent said one timing signal and a second portion beyond said another timing signal; means for adjusting the phase of said given signal with respect to said comparison wave over the region of the latter's extent between said two portions, said region encompassing a phase angle at least equal to that between two adjacent timing signals; and means responsive to the adjustment of phase of said given signal beyond said region to one of said portions for shifting the phase of said comparison wave one of said given phase angles in the direction of said one portion while maintaining the phase of said given signal with respect to said reference signal the same immediately after said shifting of said comparison wave said given phase angle as immediately before said shifting of said comparison wave said given phase angle.

4. A circuit as set forth in claim 3 wherein siad reference signal comprises a pulse, said comparison wave comprises a linear wave, and said given signal comprises a linear wave having a substantially steeper wave front than said comparison wave.

5. A circuit for adjusting the time of occurrence of a first signal relative to a second signal within a given timing range until the former is at a desired time delay with respect to the latter comprising means for generating timing signals spaced from one another known intervals of time which are fractions of said timing range, one of said timing signals being in a given phase relationship with said second signal; means for generating a comparison wave having a duration greater than the time interval between adjacent pulses and extending from a timing signal beyond at least one adjacent timing signal, said comparison wave having a center region at least equal to the time interval between adjacent pulses and extending from a point adjacent one timing signal to a point beyond said adjacent timing signal, said comparison wave passing through a reference voltage; means for maintaining said first signal at a phase with respect to said comparison wave which is a function of the intersection in point of time of said comparison wave and said reference voltage; means for deriving from said first and second signals a control voltage having a sense dependent on the sense of the difference in phase between said first and second signals; means responsive to said control voltage for adjusting the direct voltage level of said comparison wave with respect to said reference voltage while maintaining the same phase of said comparison wave with respect to said timing signals; and means responsive to the intersection in point of time of said reference voltage and said comparison wave beyond said center region of said comparison wave for shifting said comparison wave one of said known intervals of time which is a fraction of said timing range in the direction from the center of said comparison wave toward said last-named intersection in point of time.

6. A circuit as set forth in claim 5 wherein said region of said comparison wave extending from a point adjacent one timing signal to a point beyond said adjacent timing signal is linear.

7. A circuit as set forth in claim 5 wherein said first signal comprises a steep fronted wave and said second signal comprises a pulse.

8. A system operative within a given timing range for continuously indicating a delay interval within said range between a reference signal and a second signal comprising means for generating timing signals spaced from one another predetermined intervals of time which are fractions of said timing range, one of said timing signals being in a predetermined phase relationship with said reference signal; means for generating a first comparison wave in a given phase relationship with another of said timing signals which extends from one limit voltage through a reference voltage to a second limit voltage, said one limit voltage differing in one sense from said reference voltage and said second limit voltage differing in another sense from said reference voltage; means for generating a second comparison wave at a time determined by the intersection along the time axis of said reference voltage and said first comparison wave; means for comparing the phase of at least a portion of said second comparison wave with that of said second signal and deriving therefrom a control voltage having a sense dependent on the sense of the difference in phase of said second signal from said second comparison wave from a predetermined phasal relationship; means responsive to said control voltage for adjusting the amplitudes of said limit voltages relative to said reference voltage so as to bring said second comparison wave into said predetermined phasal relationship with said second signal while maintaining said first comparison wave in said given phase relationship with said another of said timing signals; and means responsive to a difference in amplitude of less than a predetermined amount between said reference voltage and one of said limit voltages for shifting said first comparison wave one of said predetermined fractional intervals of time in the proper sense to render said difference in amplitude between said reference voltage and said one limit voltage greater than said predetermined amount, while maintaining the same intersection point along the time axis of said reference voltage and said first comparison wave.

9. A system operative within a given timing range for continuously indicating a delay interval within said range between a reference signal and a second signal comprising means for generating timing signals spaced from one another predetermined intervals of time which are fractions of said timing range, one of said timing signals being in a predetermined phase relationship with said reference signal; means for generating a first comparison wave in a given phase relationship with another of said timing signals which extends from one limit voltage through a reference voltage to a second limit voltage, said one limit voltage differing in one sense from said reference voltage and said second limit voltage differing in another sense from said reference voltage, and which has a duration substantially greater than the time interval between adjacent ones of said timing signals; means for generating a second comparison wave at a time determined by the intersection along the time axis of said reference voltage and said first comparison wave; means for comparing the phase of at least a portion of said second comparison wave with that of said second signal and deriving therefrom a control voltage having a sense dependent on the sense of the difference in phase of said second signal from said second comparison wave from a predetermined phasal relationship; means responsive to said control voltage for adjusting the amplitude of said one of said limit voltages relative to said reference so as to bring said second comparison wave into said predetermined phasal relationship with said another of said timing signals; and means responsive to a difference in amplitude of less than a predetermined amount between said reference voltage and one of said limit voltages for shifting said first comparison wave one of said predetermined fractional intervals of time in the proper sense to render said difference in amplitude between said reference voltage and said one limit voltage greater than said predetermined amount, while maintaining the same the intersection point along the time axis of said reference voltage and said first comparison wave.

10. A system as set forth in claim 9 wherein said timing signals comprise pulses, said comparison wave comprises a linear wave, and said second comparison wave is initiated coincidentally with the point in time that said first comparison wave intersects said reference voltage.

11. A system operative within a given timing range for continuously indicating a delay interval within said range between a first pulse and a second pulse comprising means for generating timing signals spaced from one another predetermined intervals of time which are fractions of said timing range, one of said timing signals being in phase with said first pulse; means for generating a first linear wave in phase with a timing signal which extends from one limit voltage through a reference voltage to a second limit voltage, said first linear wave extending from one timing signal beyond at least one other timing signal and having a center region having a duration at least equal to the time interval between timing signals; means for generating a second linear wave at a time determined by the intersection along the time axis of said reference voltage and said first linear wave, said second linear wave having a substantially steeper slope than said first linear wave; means for comparing the phase of at least a portion of said second linear wave with that of said second pulse and deriving therefrom a control voltage having a sense dependent on the sense of the difference in phase of said second pulse from said second linear wave; means responsive to said control voltage for adjusting the amplitude of said limit voltages relative to said reference voltage so as to bring said second linear wave into phase with said second pulse while maintaining said first linear wave in the same phase relationship with said timing signals; and means responsive to the intersection along the time axis of said reference voltage and said first linear wave at a point outside of said center region of said first linear wave for shifting said first linear wave one of said predetermined fractional intervals of time in the proper sense to return the point of intersection of said reference voltage and said first linear wave to said center region of said first linear wave, while maintaining the same the intersection point along the time axis of said first linear wave and said reference voltage.

12. A system as set forth in claim 11 and further including means including a mechanical indicating device responsive to said control voltage for continuously indicating the delay interval between said first pulse and said second pulse.

13. In a pulse-echo system including transmitter means for transmitting a pulse to a reflecting object and receiver means for receiving an echo pulse from said object, in combination, means for generating timing pulses spaced from one another predetermined intervals of time which are fractions of the time required for said transmitted pulse to reach the furthest object of interest and be reflected therefrom; synchronizing means for synchronizing the phase of one of said timing pulses with that of said transmitted pulse; means for generating a first linear wave in phase with a timing pulse which extends from one limit voltage through a reference voltage to a second limit voltage, said first linear wave extending from one timing pulse beyond at least one other timing pulse and having a center region having a duration at least equal to the time interval between timing pulses, said echo pulse occurring at a time within the time of occurrence of said center region; means for generating a second linear wave at a time determined by the intersection along the time axis of said reference voltage and said first linear wave, said second linear wave having a substantially steeper slope than said first linear wave; means for comparing the phase of at least a portion of said second linear wave with that of said echo pulse and deriving therefrom a control voltage having a sense dependent on the sense of the difference in phase between said echo pulse and said second linear wave; means responsive to said control voltage for adjusting the direct voltage level of said first linear wave so as to bring said second linear wave into phase with said echo pulse while maintaining said first linear wave in the same phase relationship with said timing pulses; and phase shifting means responsive to the intersection along the time axis of said reference voltage and said first linear wave at a point outside of said center region of said first linear wave for shifting said first linear wave one of said predetermined fractional intervals of time in the proper sense to return the point of intersection of said reference voltage and said first linear wave to said center region of said first linear wave, while maintaining the same the intersection point along the time axis of said first linear wave and said reference voltage.

14. A pulse-echo system as set forth in claim 13 wherein said phase shifting means includes a plurality of binary divider stages connected in cascade for generating a gate signal having a phase dependent on the manner of connection of the outputs of the individual ones of said stages; and selector means responsive to said control voltage for selecting the desired combination of outputs of said individual stages.

15. A pulse-echo system as set forth in claim 14 and further including direct reading indicator means for indicating the distance of an object from which a transmitted pulse is reflected as an echo pulse; and indicator control means responsive to said control voltage for actuating said indicator.

16. A pulse-echo system as set forth in claim 13 and further including a calibration system comprising means for blocking said receiver during the normal period of reception of said echo pulse; and means for actuating said transmitter causing it to transmit a calibration pulse incoincidence with the timing pulse closest in point of time to said echo pulse, whereby said pulse-echo system should indicate a distance equivalent to the time delay between the normal transmitted pulse and said calibration pulse.

17. A pulse-echo system as set forth in claim 16 and further including attenuating means in said receiver for attenuating said calibration pulse to prevent the latter from driving the receiver to saturation.

18. A pulse-echo system as set forth in claim 13 and further including indicating means responsive to said control voltage for indicating the distance of said object reflecting said echo pulse; and a calibration system comprising means for blocking said receiver during the normal period of reception of said echo pulse; and means for actuating said transmitter causing it to transmit a calibration pulse in coincidence with the timing pulse closest in point of time to said echo pulse, whereby said pulse-echo system should indicate on said indicating means a distance equivalent to the time delay between the normal transmited pulse and said calibration pulse.

19. A pulse-echo system as set forth in claim 18 and further including means for adjusting said reference voltage to correct any inaccuracies in the distance indication provided by said indicator during calibration thereof.

20. A pulse-echo system as set forth in claim 15 and further including a calibration system comprising means for blocking said receiver during the normal period of reception of said echo pulse; and means for actuating said transmitter causing it to transmit a calibration pulse in coincidence with the timing pulse closest in point of time to said echo pulse, whereby said pulse-echo system should indicate a distance equivalent to the time delay between the normal transmitted pulse and said calibration pulse.

21. In a phase shifter, in combination, means producing a first wave having a linear region extending between a first limit and a second limit; means for accurately shifting the phase of said first wave by fixed, known amounts, each not greater than that defined by said region, over a given phase angle; means for producing a reference voltage; means responsive to a predetermined amplitude relationship between said first linear wave and said reference voltage for producing a second wave; means including a source of clamping voltage for adjusting the direct potential level of said first wave for smoothly shifting the phase of said second wave within said region; and means responsive to a shift in phase of said second wave with respect to said first wave beyond said region in either direction for shifting the phase of said reference wave in that direction said known amount and simultaneously adjusting the level of said clamping voltage to a point such that said shift in phase of said first wave has no effect on said second wave.

22. In a phase shifter, in combination, means producing a reference voltage; means producing a first wave having a linear region extending between a first limit and a second limit, and passing through said reference voltage; means for accurately shifting the phase of said first wave by fixed, known amounts, each not greater than that defined by said region over a given phase angle; means responsive to the intersection in point of time of said first wave with said reference voltage for producing a second wave; clamping means including a source of clamping voltage for adjusting the direct potential level of said first wave for smoothly shifting the phase of said second wave within said region; and phase shifting means responsive to a shift in phase of said second wave with respect to said first wave beyond said region in either direction for shifting the phase of said first wave in that direction said known amount and simultaneously adjusting the level of said clamping voltage to a new value such that the intersection in point of time of said first wave with said reference wave is substantially the same after the shift thereof as before the shift thereof.

23. In a phase shifter as set forth in claim 22, said clamping means including a linear potentiometer.

24. In a phase shifter as set forth in claim 22, said clamping means including a linear potentiometer having a pair of arms, one of said arms being in circuit at a time, said arm in circuit providing an adjustable level of clamping voltage; and further including arm selector means responsive to said shift in phase of said second wave with respect to said first wave beyond said region for removing said arm in circuit and placing the other of said arms in circuit with said linear potentiometer to select a new level of clamping votage such that the shift in phase of said first wave said known amount has no effect on the phase of said second wave.

25. In a phase shifter as set forth in claim 24, said phase shifting means including a plurality of binary divider stages connected in cascade for generating a gate signal having a phase dependent on the manner of connection of the outputs of the individual ones of said stages; and selector means responsive to the shift in phase of said second wave with respect to said first wave beyond said region for selecting the desired combination of outputs of said individual stages.

26. In combination, means for generating a reference wave; means for generating a second wave; means for measuring the phase of said second wave with respect to said reference wave within predetermined angular limits; and means responsive to the phase difference between said waves at either one of said limits for shifting the phase of said reference wave by a given known amount, not greater than the phase angle defined by said two limits, in the direction of said one limit.

27. In combination, means for generating a reference wave; means for generating a second wave; means for measuring the phase of said second wave with respect to said reference wave within predetermined angular limits; and means responsive to the phase difference between said waves at one of said limits for shifting the phase of said reference wave by a given known amount equal to the phase angle defined by said two limits, in the direction of said one limit.

28. In combination, means for generating a reference wave; means for generating a second wave; means for measuring the phase of said second wave with respect to said reference wave within predetermined limits; and means responsive to the phase difference between said waves whenever said second wave reaches either one of said limits for shifting the phase of said reference wave by an amount equal to the phase angle defined by said two limits, in the direction of said one limit.

29. In combination, means for generating a first linear wave; means for generating a second linear wave having a slope substantially steeper than that of said first linear wave; means for measuring the phase of said second linear wave with respect to said first linear wave within predetermined limits; and means responsive to the phase difference between said waves whenever said second linear wave attains either one of said limits for shifting the phase of said first linear wave by a given known amount equal to the phase angle defined by said two limits, in the direction of said limit.

References Cited in the file of this patent

UNITED STATES PATENTS 2,513,988 Wolff ---------------- July 4, 1950

FOREIGN PATENTS 522,072 Great Britain ---------- Mar. 22, 1945